Patented Sept. 7, 1937

2,092,300

UNITED STATES PATENT OFFICE 2,092,300

NONLIVERING COATING COMPOSITIONS

Charles Bogin, Terre Haute, Ind., assignor to Commercial Solvents Corporation, Terre Haute, Ind., a corporation of Maryland No Drawing. Application October 19, 1934, Serial No. 749,073

6 Claims. (Cl. 134—26)

My invention relates to improvements in coating compositions containing basic pigments and modified polybasic acid-polyhydric alcohol resins. More specifically, my invention relates to improved coating compositions of this nature having an increased resistance to gelling or livering.

A relatively large number of modified polybasic acid-polyhydric alcohol resins have been developed for use in coating materials. These resins, which are usually of the glycerol-phthalic anhydride type, have been modified by the introduction of drying oils, non-drying or semi-drying oils, phenol-aldehyde resins, and the like, to improve their solubility in organic solvents and, in same cases, to impart drying or oxidizing properties to them. All of these resins have found use as the basic film-forming ingredient of varnishes or enamels or as a supplementary film-forming ingredient in lacquers. It has been found, however, that in the case of enamels or pigmented lacquers, these materials could not safely be used in combination with basic pigments because of a pronounced tendency to gell or liver.

The livering of coating materials of this type may take the form of either gellation of the entire coating material or agglomeration of a part of the material into large particles, leaving the remainder as a liquid. The former is the more common form of this phenomenon, but even in this case agglomerates may be found in the gelled material. In the case of coating materials containing relatively large amounts of zinc oxide and certain resins having a pronounced livering tendency, the gellation may take place within a few days after the preparation of the coating material and nearly always within a month. Certain factors, such as the acidity of the solvent employed, the amount of basic pigment utilized, the temperature, etc., will determine the speed at which livering takes place, but in any event it will be found to occur if these two constituents are present.

Numerous efforts have been made to counteract this tendency to liver, particularly efforts directed toward modifying the resins. Up to the present time, however, none of these attempts has met with success. If the nature of the resin is changed so as to avoid livering, the desirable film-forming properties are also modified to an unwanted extent. Attempts to avoid this difficulty by neutralizing the acidity of the resins have also met with failure.

I have now discovered that the addition of very small quantities of malic acid to the coating materials will reduce the tendency to liver to a marked extent and, in some cases, will obviate this difficulty entirely. In some instances the incorporation of only 0.25% of malic acid will entirely prevent livering or agglomeration of the coating material. In general, an addition of 0.25 to 2.0% of malic acid will prevent gelling for the ordinary shelf life of the coating materials. For example, in laboratory tests using various lacquers and enamels containing zinc oxide, those in which 0.5% of malic acid was incorporated had not livered at the end of a six months' observation period, whereas those containing no malic acid had livered or agglomerated in a substantially shorter time, usually in less than two months.

The coating materials in which malic acid may be used as the stabilizing agent may be any of the usual types of lacquers or varnish base enamels. The lacquers may be prepared from nitrocellulose of the half-second type or other suitably low viscosity cottons such as four second cotton. The usual plasticizers such as dibutyl phthalate, tricresyl phosphate or castor oil may be used. The solvents may be any of the usual esters, alcohols, ketones, ethers, etc., but as will be pointed out below, a large proportion of hydroxy acid esters such as butyl lactate should preferably not be employed if the pigment comprises mainly basic pigments such as zinc oxide.

The enamels may be any of the usual types prepared from modified polybasic acid-polyhydric alcohol resins. The usual hydrocarbon solvents may be used; and, with certain resins, drying oils and driers which are compatible with the resins and solvents may also be employed in the known manner.

In the case of either the lacquers or the enamels, the pigment may comprise essentially a basic pigment such as zinc oxide or mixtures of such basic pigments with other materials such as titanium dioxide, zinc sulphide, antimony oxide, and the like.

The malic acid may be incorporated into the coating materials in any convenient manner. For example, it may be added prior to the introduction of the pigment and thoroughly dispersed by grinding or agitation, or it may be ground into the liquid simultaneously with the pigment.

The following examples will serve to further illustrate my invention. Examples I and II represent simple formulae for a lacquer and an enamel, respectively, which illustrate the general application of my invention.

Example I

| | Grams |
|---|---|
| Nitrocellulose (½ second) | 6.9 |
| Drying oil modified glycerol-phthalate resin | 27.7 |
| Zinc oxide | 55 |
| Malic acid | 1.1 |

In 100 c. c. of a solvent mixture consisting of:

| | Per cent |
|---|---|
| Butyl acetate | 67 |
| Xylol | 33 |

The above lacquer was found to be in perfect condition at the end of an observation period of 7 months, whereas the same lacquer without malic acid was found to have livered at the end of an observation period of 4 months.

Example II

| | Grams |
|---|---|
| Drying oil modified glycerol-phthalate resin | 50 |
| Zinc oxide | 67 |
| Malic acid | 1.3 |

In 100 c. c. of xylol.

The above enamel was found to be in perfect condition at the end of a 7 months' observation period, whereas the same enamel without malic acid was found to be practically solid at the end of a 3 months' observation period.

The following two examples illustrate the effectiveness of malic acid as an anti-livering agent even in cases where hydroxy acid esters are used as solvents in addition to using basic pigments such as zinc oxide.

Example III

| | Grams |
|---|---|
| Nitrocellulose | 8 |
| Semi-drying oil modified glycerol-phthalate resin | 24 |
| Zinc oxide | 40 |
| Malic acid | 1.3 |

In 100 c. c. of a solvent mixture of the following composition:

| | Percent |
|---|---|
| Butyl lactate | 30 |
| Butyl alcohol | 15 |
| Ethyl alcohol | 10 |
| Toluol | 45 |

The above lacquer was found to be in perfect condition at the end of an observation period of 10 months, whereas the same lacquer without malic acid was found to have agglomerated prior to this observation.

Example IV

| | Grams |
|---|---|
| Nitrocellulose | 10 |
| Semi-drying oil modified glycerol-phthalate resin | 15 |
| Non-drying oil modified glycerol-phthalate resin | 15 |
| Zinc oxide | 3.5 |
| Titanium dioxide | 41.5 |
| Malic acid | 0.5 |

The above lacquer was found to be in perfect condition at the end of a 6 months' observation period, whereas the same lacquer without malic acid was found to have livered and agglomerated badly prior to this observation.

It may be seen from the above two examples that malic acid is a satisfactory anti-livering agent in cases where a relatively high proportion of basic pigment and relatively low proportion of hydroxy acid ester are employed, or where a relatively low proportion of basic pigment and a relatively high proportion of a hydroxy acid ester are employed. However, in cases where both of these materials are present in high proportion the livering tendency may be so pronounced that even the reduction secured by the use of malic acid may not be sufficient for some purposes.

The following two examples illustrate the effectiveness of malic acid as an anti-livering agent in enamels using different types of modified glycerol-phthalate resins.

Example V

| | Grams |
|---|---|
| Non-drying oil modified glycerol-phthalate resin | 35 |
| Zinc oxide | 40 |
| Malic acid | 1 |

In 100 c. c. of xylol.

This enamel was found to be in satisfactory condition at the end of 6 months, whereas the same enamel without malic acid was found to have become practically solid in about 6 weeks.

Example VI

| | Grams |
|---|---|
| Glycerol-phthalate resin modified with drying oil and phenol-aldehyde intermediate | 35 |
| Zinc oxide | 40 |
| Malic acid | 1 |

In 100 c. c. of xylol.

This enamel was found to be in satisfactory condition at the end of an observation period of 10 months, whereas the same enamel without malic acid was found to have livered in 10 weeks.

The following four examples illustrate suitable forms of lacquers and straight synthetic resin varnishes, both white and tinted, formulated for spray application.

Example VII

| | Grams |
|---|---|
| Nitrocellulose | 5 |
| Glycerol-phthalate resin | 15 |
| Zinc oxide | 9 |
| Malic acid | 0.7 |

In 100 c. c. of the following solvent mixture:

| | Percent |
|---|---|
| Ethyl alcohol | 4 |
| Ethyl acetate | 8 |
| Butyl alcohol | 8 |
| Butyl acetate | 30 |
| Xylol | 15 |
| Toluol | 35 |

Example VIII

| | Grams |
|---|---|
| Nitrocellulose | 5 |
| Drying oil modified glycerol-phthalate resin | 15 |
| Zinc oxide | 6 |
| Prussian blue | 3 |
| Malic acid | 0.5 |

In 100 c. c. of the following solvent mixture:

| | Percent |
|---|---|
| Ethyl alcohol | 4 |
| Ethyl acetate | 8 |
| Butyl alcohol | 8 |
| Butyl acetate | 30 |
| Xylol | 15 |
| Toluol | 35 |

Example IX

| | Grams |
|---|---|
| Drying oil modified glycerol-phthalate resin | 31.5 |
| Zinc oxide | 13.5 |
| Malic acid | 0.7 |

In 100 c. c. of the following solvent mixture:

| | Percent |
|---|---|
| Xylol | 50 |
| Petroleum naphtha | 40 |
| Butyl alcohol | 10 |

Example X

| | Grams |
|---|---|
| Drying oil modified glycerol-phthalate resin | 31.5 |
| Zinc oxide | 9 |
| Prussian blue | 4.5 |
| Malic acid | 0.5 |

In 100 c. c. of the following solvent mixture:

| | Percent |
|---|---|
| Xylol | 50 |
| Petroleum naphtha | 40 |
| Butyl alcohol | 10 |

While the exact mechanism whereby malic acid reduces the tendency to liver in coating materials such as those illustrated above is not known, it is probable that rather than entering into a chemical reaction it merely prevents the reaction product of the basic pigment and acidic radicals in the resin from assuming the physical state of a gell or of large agglomerates. This theory is substantiated in part by the fact that other acids such as tartaric, succinic, fumaric, benzoic, and phthalic fail to accomplish this purpose. It is to be understood, however, that my invention is not to be construed as limited to any particular theory by which it may operate.

It is to be further understood that while my invention is substantially described by the above disclosure and examples, it is not to be construed as limited to the use of the materials or combinations specifically named. Although zinc oxide was the only basic pigment specified in the examples, the invention is equally applicable to coating materials containing any other basic pigment, such as, for example, certain grades of lithopone which have an alkaline reaction. Likewise, any of the usual types of modified polybasic acid-polyhydric alcohol resins may be used, provided they are known to be suitable for coating materials aside from their livering tendencies.

It should be noted, of course, that certain of these resins may have such a pronounced tendency to liver that even the reduction secured by the use of malic acid may not be sufficient for some uses. However, it will be found that malic acid will improve any coating material of this type to some extent and will improve most of these coating materials sufficiently to allow for normal shelf life. The coating materials may be modified in any desired manner, as long as they comply with the specifications with regard to livering disclosed above. In general, it may be said that any modifications or the use of any equivalents which would naturally occur to those skilled in the art may be employed without departing from the scope of my invention.

My invention now having been described, what I claim is:

1. A method for reducing the tendency to liver or agglomerate in coating materials containing a basic pigment and a film forming agent comprising modified polyhydric acid-polybasic acid resin of a character and in an amount to cause a pronounced tendency to gell or liver, which comprises adding malic acid to said coating materials.

2. A method for reducing the tendency to liver or agglomerate in coating materials containing a basic pigment and a film forming agent comprising drying oil modified polyhydric alcohol-polybasic acid resin of a character and in an amount to cause a pronounced tendency to gell or liver, which comprises adding malic acid to said coating materials.

3. A method for reducing the tendency to liver or agglomerate in coating materials containing zinc oxide and a film forming agent comprising modified glycerol-phthalate resin of a character and in an amount to cause a pronounced tendency to gell or liver, which comprises adding 0.25% to 2.0% of malic acid to said coating materials.

4. A coating composition having reduced tendency to liver or agglomerate, which comprises a basic pigment, a film forming agent comprising modified polyhydric alcohol-polybasic acid resin of a character and in an amount to cause a pronounced tendency to gell or liver, and malic acid.

5. A coating composition having a reduced tendency to liver or agglomerate, which comprises a basic pigment, a film forming agent comprising drying oil modified polyhydric alcohol-poly-basic acid resin of a character and in an amount to cause a pronounced tendency to gell or liver, and malic acid.

6. A coating composition having a reduced tendency to liver or agglomerate, which comprises zinc oxide, a film forming agent comprising modified glycerol phthalate resin of a character and in an amount to cause a pronounced tendency to gell or liver, and 0.25% to 2.0% of malic acid.

CHARLES BOGIN.